United States Patent
Schmitz et al.

(10) Patent No.: US 10,766,384 B2
(45) Date of Patent: Sep. 8, 2020

(54) CHILD SAFETY SEAT

(71) Applicant: Britax Römer Kindersicherheit GmbH, Leipheim (DE)

(72) Inventors: Michael Schmitz, Ulm (DE); Richard Henseler, Ulm (DE)

(73) Assignee: Britax Römer Kindersicherheit GmbH, Leipheim (DE)

( * ) Notice: Subject to any disclaimer, the term of this patent is extended or adjusted under 35 U.S.C. 154(b) by 0 days.

(21) Appl. No.: 16/220,561

(22) Filed: Dec. 14, 2018

(65) Prior Publication Data

US 2019/0184863 A1 Jun. 20, 2019

(30) Foreign Application Priority Data

Dec. 14, 2017 (EP) .................................. 17207244

(51) Int. Cl.
| | | |
|---|---|---|
| *B60N 2/26* | (2006.01) | |
| *B60N 2/28* | (2006.01) | |
| *B60N 2/42* | (2006.01) | |
| *B60N 2/427* | (2006.01) | |

(52) U.S. Cl.
CPC .......... *B60N 2/2809* (2013.01); *B60N 2/286* (2013.01); *B60N 2/2821* (2013.01); *B60N 2/2875* (2013.01); *B60N 2/2887* (2013.01)

(58) Field of Classification Search
CPC .... B60N 2/2809; B60N 2/2821; B60N 2/286; B60N 2/2875; B60N 2/2887
USPC .......... 297/216.11, 253, 254, 256.13, 256.16
See application file for complete search history.

(56) References Cited

U.S. PATENT DOCUMENTS

| | | | | |
|---|---|---|---|---|
| 4,033,622 A | * | 7/1977 | Boudreau ............ | B60N 2/2806 297/256.13 |
| 4,429,916 A | * | 2/1984 | Hyde .................... | B60R 22/105 297/256.15 |
| 4,681,368 A | * | 7/1987 | Heath .................. | B60N 2/2809 297/216.11 |
| 5,630,645 A | * | 5/1997 | Lumley ................ | B60N 2/2809 297/216.11 X |
| 5,695,243 A | * | 12/1997 | Anthony .............. | B60N 2/2809 297/216.11 |
| 6,267,442 B1 | * | 7/2001 | Shiino .................. | B60N 2/2809 297/254 X |
| 6,450,576 B1 | * | 9/2002 | Rhein .................. | B60N 2/2806 297/250.1 |
| 6,517,154 B2 | * | 2/2003 | Sawamoto ........... | B60N 2/2809 297/216.11 X |
| 6,554,357 B2 | * | 4/2003 | Moffa .................... | B60N 2/242 297/253 |

(Continued)

FOREIGN PATENT DOCUMENTS

| | | | | |
|---|---|---|---|---|
| DE | 29916818 U1 | * | 2/2000 | ........... B60N 2/2806 |
| DE | 19945680 A1 | * | 4/2001 | ............. B60N 2/286 |

(Continued)

*Primary Examiner* — Rodney B White
(74) *Attorney, Agent, or Firm* — Burr & Forman, LLP

(57) ABSTRACT

A child safety seat includes a base having an attachment point, and a shell having a guiding element mounted on an upper portion of the shell. The child safety seat additionally includes a top tether connected to the attachment point of the base, and the guiding element is configured to abut against and slidably support the top tether when the top tether is secured to an anchoring point of a vehicle.

15 Claims, 3 Drawing Sheets

(56) References Cited

U.S. PATENT DOCUMENTS

| | | | | |
|---|---|---|---|---|
| 6,767,057 B2* | 7/2004 | Neelis | B60N 2/2809 | 297/216.11 |
| 6,869,141 B2* | 3/2005 | Yamaoka | B60N 2/2809 | 297/253 |
| 7,021,709 B2* | 4/2006 | Dolan | B60N 2/002 | 297/253 X |
| 7,029,069 B2* | 4/2006 | Hendren | B60N 2/2821 | 297/256.12 |
| 7,390,064 B2* | 6/2008 | Horton | B60N 2/2809 | 297/216.11 |
| 7,431,339 B2* | 10/2008 | Yamamoto | B60N 2/2809 | 297/253 X |
| 7,441,823 B2* | 10/2008 | Bertoli | B60N 2/2809 | 297/250.1 X |
| 7,466,221 B1* | 12/2008 | Lehr | B60R 22/48 | 340/457.1 |
| 7,658,444 B2* | 2/2010 | Murphy | B60N 2/2809 | 297/216.11 |
| 7,758,096 B2* | 7/2010 | Ohta | B60N 2/2809 | 297/250.1 X |
| 8,235,463 B2* | 8/2012 | Stiyer | B60N 2/2809 | 297/253 |
| 8,348,337 B2* | 1/2013 | Franck | B60N 2/2809 | 297/216.11 |
| 8,444,222 B2* | 5/2013 | Buckingham | B60N 2/2887 | 297/253 |
| 8,714,644 B2* | 5/2014 | Biaud | B60N 2/2806 | 297/250.1 |
| 8,905,478 B2* | 12/2014 | Strong | B60N 2/2806 | 297/253 X |
| 9,061,611 B2* | 6/2015 | Love | B60N 2/2887 | |
| 9,415,706 B2* | 8/2016 | Rabeony | B60N 2/2809 | |
| 10,220,734 B2* | 3/2019 | Cohen | B60N 2/2806 | |
| 10,384,570 B2* | 8/2019 | Pline | B60N 2/64 | |
| 10,500,990 B2* | 12/2019 | Cohen | B60N 2/2887 | |
| 2002/0000744 A1* | 1/2002 | Maciejczyk | B60N 2/2809 | 297/254 |
| 2002/0043836 A1* | 4/2002 | Maciejczyk | B60N 2/2869 | 297/250.1 |
| 2003/0132654 A1* | 7/2003 | Okamoto | B60N 2/2809 | 297/331 |
| 2003/0151281 A1* | 8/2003 | Williams | B60N 2/0232 | 297/254 X |
| 2004/0032154 A1* | 2/2004 | Menon | B60N 2/2809 | 297/253 |
| 2004/0041450 A1* | 3/2004 | Yamaoka | B60N 2/2809 | 297/254 |
| 2004/0095004 A1* | 5/2004 | Horton | B60N 2/2884 | 297/250.1 |
| 2005/0006934 A1* | 1/2005 | Rabeony | B60N 2/2809 | 297/250.1 |
| 2005/0280297 A1* | 12/2005 | Patterson | B60N 2/2809 | 297/217.4 |
| 2006/0049622 A1* | 3/2006 | Yamamoto | B60N 2/2809 | 280/801.1 |
| 2007/0040406 A1* | 2/2007 | Jovicevic | B60N 2/2809 | 296/65.01 |
| 2007/0194590 A1* | 8/2007 | Bertoli | B60N 2/2809 | 296/68.1 |
| 2008/0136150 A1* | 6/2008 | Shin | B60R 21/01556 | 297/253 X |
| 2008/0246265 A1* | 10/2008 | Walton | B60N 2/242 | 280/801.1 |
| 2008/0296944 A1* | 12/2008 | Nakagawa | B60N 2/2809 | 297/256.16 X |
| 2009/0026819 A1* | 1/2009 | Zahar | B60N 2/2809 | 297/256.16 |
| 2010/0033001 A1* | 2/2010 | Boyer | B60N 2/2809 | 297/253 |
| 2010/0109394 A1* | 5/2010 | Ruthinowski | B60N 2/2809 | 297/216.11 |
| 2010/0301658 A1* | 12/2010 | Furas | B60N 2/2806 | 297/463.1 |
| 2011/0193394 A1* | 8/2011 | Stiyer | B60N 2/2893 | 297/463.1 |
| 2012/0146369 A1* | 6/2012 | Gaudreau, Jr. | B60N 2/2809 | 297/216.11 |
| 2015/0336481 A1* | 11/2015 | Horsfall | B60N 2/2863 | 297/256.16 X |
| 2016/0082865 A1* | 3/2016 | Zhou | B60N 2/2809 | 297/216.11 |
| 2017/0217337 A1* | 8/2017 | Sammons | B60N 2/80 | |
| 2017/0236395 A1* | 8/2017 | Cech | G08B 21/0236 | 340/449 |
| 2018/0208085 A1* | 7/2018 | Renaudin | B60N 2/2887 | |
| 2019/0084448 A1* | 3/2019 | Hoover | B60N 2/2809 | |

FOREIGN PATENT DOCUMENTS

| | | | | |
|---|---|---|---|---|
| EP | 0667256 A2 * | 8/1995 | | B60N 2/286 |
| FR | 2868023 A1 * | 9/2005 | | B60N 2/2809 |
| FR | 3032400 A1 * | 8/2016 | | B60N 2/2872 |
| FR | 3032401 A1 * | 8/2016 | | B60N 2/2809 |
| GB | 1519793 A * | 8/1978 | | B60N 2/2806 |
| JP | 2003191780 A * | 7/2003 | | B60N 2/3088 |
| WO | WO-0134428 A1 * | 5/2001 | | B60N 2/2809 |

* cited by examiner upright reclined

CHILD SAFETY SEAT

CROSS REFERENCE TO RELATED APPLICATION

This application claims priority to European application number 17207244.9 filed Dec. 14, 2017, the entire contents of which are hereby incorporated by reference in its entirety.

The present invention relates to child safety seats for use in a vehicle and, more particularly, to a child safety seat designed to increase the level of protection provided to a child seated in the child safety seat. In particular, the child safety seat is designed to reduce the risk of injury for a child in the child safety seat due to potential misuse without increasing production costs of the child safety seat substantially.

Child safety seats are employed for safely transporting children in vehicles, in particular in cars. There is a large variety of child safety seats adapted for transporting children of different age ranges. In Europe, a system of groups has been established for categorizing child safety seats. This system ranges from "Group 0" seats suitable for newborn children via "Group 1" and "Group 2" seats up to "Group 3" seats suitable for children up to twelve years old. Besides the age of a child, other factors that have to be taken into account when choosing a child safety seat for a specific child include the weight and the height of the child. In particular, the new European standard R129 focuses on the size of the child. Additionally, it has to be ensured that the total weight of the child and the child safety seat does not exceed a maximum weight.

In principle, a child safety seat can be mounted in a vehicle in one of two orientations: forward-facing, i.e. in such a way that a child positioned in the child safety seat faces the front of the vehicle carrying the child safety seat; or rear-facing, i.e. in such a way that a child positioned in the child safety seat faces the rear of the vehicle carrying the child safety seat. The present invention relates in particular to child safety seats configured for forward-facing installation in the vehicle. The present invention, however, is not limited to forward-facing child safety seats, and will be applicable to rear-facing child safety seats.

The forces acting on a child sitting in a child safety seat during a crash of the vehicle carrying the child safety seat are influenced by the way the child safety seat is attached to the vehicle, i.e. by how the child safety seat is fixed to the vehicle seat it is placed on. Generally, there a two systems for fixing a child safety seat on a vehicle seat. The first system employs a seat belt provided in the vehicle for securing the child safety seat. In this system, at least one of the seat belts of the vehicle is guided in a prescribed way around or through the child safety seat thus securing the child safety seat in the desired position and orientation. An advantage of this system is that it exclusively makes use of fastening means that are usually present in every vehicle, i.e. the seat belts of the vehicle. Securing a child safety seat with a vehicle seat belt may, however, be cumbersome. Therefore, in practice, many child safety seats of this type are improperly installed in the vehicle. The second system employs fixing means which are provided in the vehicle specifically for securing a child safety seat. In Europe, the ISOFIX system has been introduced for this purpose. A vehicle seat adapted for installation of an ISOFIX child safety seat (i.e. a child safety seat equipped with the ISOFIX system) comprises anchors (ISOFIX anchors) which are provided at the lower end of the seat's seatback at the junction between the seat cushion and the seatback and which are fixedly attached to the seat. The ISOFIX child safety seat comprises connectors or latches (ISOFIX rigid latches) which can be coupled releasably to the anchors. Consequently, using the ISOFIX system, a child safety seat can be easily and safely fixed to a vehicle seat.

The present invention is useful in relation to ISOFIX child safety seats. The present invention, however, is not limited to ISOFIX child safety seats, and it will be applicable to other child safety seats having other means for fixing the base of a child safety seat to a vehicle seat.

In the following, illustrations and descriptions refer to forward-facing ISOFIX child safety seats, which is for reasons of simplicity only and does not limit the invention to forward-facing ISOFIX child safety seats only.

In a car crash involving a front collision of the vehicle, a child safety seat is accelerated forward, i.e. towards the windscreen of the vehicle. Rotary forces will act on the child safety seat, as the center of gravity of the child safety seat is located above the ISOFIX connectors attached to the ISOFIX anchoring points. Thus, the child safety seat will be rotated forward, resulting in an increased risk of injury for the child in the child safety seat.

For this reason, top tethers are often used to prevent the child safety seat from rotating forward. A top tether can be attached to an upper portion of the back of the shell (see FIGS. 1a and 1b) or to an upper portion of a high back base depending on the design of the child safety seat.

In the first case, as can be seen from FIGS. 1a and 1b, the child safety seat comprises a lower base 12 and a shell 11 which is placed on top of the base 12 and connected to the base 12 such that the shell 11 can be reclined relative to the base 12. However, when using the recline functionality of the child safety seat, the length of the top tether 8 has to be re-adjusted as the top tether 8 is attached to an attachment point 9 at the back of the shell 11 which will change its position when the recline functionality is used.

Therefore, attachment of the top tether 8 to the shell 11 will impair the recline functionality of the child safety seat: If the child safety seat is in an upright position (see FIG. 1a), the child safety seat cannot be reclined without adjusting the length of the top tether.

Further, the recline function of the child safety seat may compromise effective operation of the anti-rotation function of the top tether 8 attached to the shell 11. A change from a reclined position (see FIG. 1b) to an upright position (see FIG. 1a) of the child safety seat will result in slack in the top tether 8 resulting in the need for re-tightening. Thus, if the top tether 8 is not re-tightened (i.e. under tension), it will not be fully effective during an accident, as the child safety seat may rotate until the slack in the top tether 8 is taken up. Depending on the geometry of the child safety seat, the difference in length is about 3 cm which involves an increased safety risk due to this possible misuse.

In the second case, the child safety seat may comprise a high back base (not illustrated) to which the top tether can be attached. Thus, as the top tether is connected to an upper portion of the high back base, the top tether will not impair a recline functionality of the child safety seat. However, providing a high back base increases both the costs and weight of the child safety seat substantially.

Therefore, it is an object of the present invention to provide a child safety seat which reduces the risk of injury for a child in the child safety seat due to potential misuse and does not require expensive additional parts which would increase production costs of the child safety seat considerably.

This and other objects are achieved by the child safety seat according to claim 1. Further advantageous features of the present invention are indicated in subclaims 2 to 13.

According to one aspect of the invention, there is provided a child safety seat comprising:

a shell having a guiding element mounted on an upper portion of the shell, and a top tether, wherein the guiding element is configured to abut against and slidably support the top tether when the top tether is secured to a first anchoring point of a vehicle and a second anchoring point which is stationary relative to the vehicle.

Advantageously, the second anchoring point is fixed to a base of the child safety seat, an ISOFIX connector of the child safety seat, or an ISOFIX anchoring point of the vehicle.

Advantageously, the guiding element is configured to abut against and slidably support the top tether in order to prevent the child safety seat from rotating forward about a fixing point at a base of the child safety seat, when the child safety seat is anchored to the vehicle at the fixing point.

The child safety seat according to the invention is prevented from rotating forward if accelerated forward (i.e. towards the windscreen of the vehicle) by inertial forces due to a front collision, for example, since the upper portion of the shell is retained by the top tether and the guiding element which is mounted on the upper portion of the shell. The top tether is under tension between the first anchoring point of the vehicle and the second anchoring point and over the guiding element. Therefore, with the guiding element abutting against the top tether, the child safety seat is prevented from rotating forward, when inertial forces directed to the front of the vehicle act on the child safety seat.

In addition, the top tether of the child safety seat according to the invention will not impair the recline functionality of the child safety seat since the second anchoring point for securing the top tether is fixed relative to the vehicle and, therefore, does not change its position when the recline function of the child safety seat is used (i.e. when the position of the child safety seat is changed from upright to reclined or vice versa). During usage of the recline function, the webbing of the top tether slides along the guiding element. Thus, re-adjustment of the length of the top tether is not necessary when changing the recline position of the child safety seat.

Advantageously, the guiding element is mounted on an upper half of a back of the shell, preferably on a top third of the back of the shell, more preferably on a top fourth of the back of the shell, and even more preferably, the guiding is mounted on a top fifth of the back of the shell.

The top tether is provided to prevent the child safety seat from rotating forward when inertial forces directed to the front of the vehicle act on the child safety seat. Thus, the guiding element should be located at an upper portion of the back of the shell of the child safety seat, i.e. near the top of the back of the shell, or more precisely, the guiding element is advantageously located at least at an upper half of a back of the shell, preferably at a top third of the back of the shell, more preferably at a top fourth of the back of the shell, and even more preferably, the guiding element is located at a top fifth of the back of the shell.

Advantageously, the guiding element may be a rod, a pulley, a tubular rod, an elongate arcuate plate or any elongate element having an arcuate cross-section. A rod or guiding rod is preferably mounted on or within the shell of the child safety seat, its longitudinal axis being arranged horizontally and essentially parallel to the surface of the webbing of the top tether when the top tether is tensioned between the first anchoring point of the vehicle and the second anchoring point. The top tether is positioned through the child safety seat such that the guiding element is between the vehicle seat and the top tether. A pulley may be arranged in a similar way. Instead of a rod, an arcuate plate or any other suitably formed part may be used, wherein the top tether is positioned through the child safety seat such that the guiding element is located between the vehicle seat and the top tether.

Alternatively, the guiding element may have a slot through which the top tether is threaded. The internal surface of the slot may be arcuate.

Preferably, the guiding element is deformable such that the guiding element will absorb force through deformation. Provided the forces exerted on the guiding element by the top tether exceed a predetermined threshold, further load will cause deformation of the guiding element.

For strong frontal impacts, the guiding element may experience a deformation which provides an energy absorption mechanism in order to reduce the forces acting on a child seated in the child safety seat during a car crash and prevent damage of the shell or other relevant load path items.

Deformation of the guiding element is determined by the material properties and/or dimensions of the guiding element.

Advantageously, the top tether is a single length of webbing.

Alternatively, the top tether may be a V-shaped top tether comprising a pair of webbing straps extending from the seat and joined together at the top tether hook. The pair of webbing straps are spaced apart at the back of the seat and the guiding element is wide enough to locate both straps and a pair of spaced apart second anchoring points are provided. Alternatively, a pair of guiding elements may be provided but a single guiding element spanning between the spaced apart tether straps is preferred.

Advantageously, the child safety seat comprises a fixing point which is located at a base of the child safety seat and is configured to anchor the child safety seat to the vehicle.

Preferably, the fixing point of the child safety seat is an ISOFIX connector.

An ISOFIX child safety seat, i.e. a child safety seat configured to be secured to a vehicle by means of the ISOFIX system, comprises ISOFIX connectors at the base of the child safety seat. The ISOFIX connectors can be releasably coupled to ISOFIX anchoring points of a vehicle equipped with the ISOFIX system. The ISOFIX anchoring points are provided at the lower edge of the seat's seatback at the junction between the seat cushion and the seatback and are fixedly attached to the seat structure in the vehicle equipped with the ISOFIX system.

Advantageously, the child safety seat has one or more openings extending from the top tether attachment point on the base of the child safety seat, past the guiding element and to the top of the seat. The openings in the child safety seat allow the top tether to be attached at the first and second anchoring points and to locate against the guiding element.

Preferably, the webbing(s) of the top tether are led, at least partly, through the interior of the shell of the child safety seat, which in addition to the guiding element, increases the area over which holding forces are applied against the webbings of the top tether.

Advantageously, the shell of the child safety seat comprises reinforcements around the mounting points of the guiding element in the upper portion of the shell.

The material of the part of the shell of the child safety seat which surrounds and/or supports the guiding element has to endure increased mechanical stress. Thus, at least parts of the shell may be reinforced to achieve higher stability and durability. However, the material of the part of the shell of the child safety seat which surrounds and/or supports the guiding element may also be chosen to experience a defined deformation to absorb force during a collision and therefore reduce the forces acting on a child seated in the child safety seat. This will also assist in preventing damage to other parts of the shell or other load path relevant items, if the forces exerted on the guiding element exceed a predetermined threshold.

Advantageously, the child safety seat is configured for forward-facing installation in the vehicle, i.e. a child sitting in the child safety seat looks towards the windscreen of the vehicle.

Specific embodiments of the invention will now be described by way of example and with reference to the accompanying drawings, in which:

FIGS. 2a and 2b show an ISOFIX child safety seat in accordance with an embodiment of the invention in an upright position (FIG. 2a) and a reclined position (FIG. 2b).

Figure 1A:
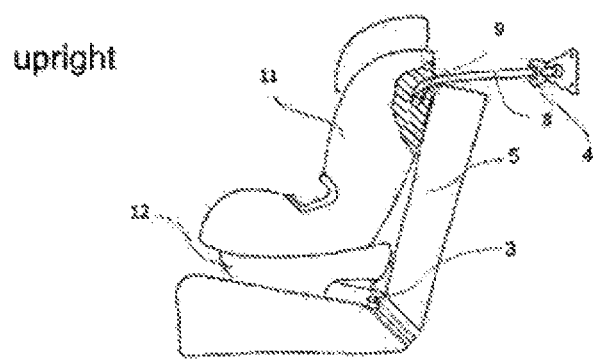
FIG. 1a shows a conventional ISOFIX child safety seat in an upright position having a top tether connected to an anchoring point of a vehicle.

The child safety seat is placed on a seat 5 of a vehicle, wherein the orientation of the child safety seat is forward-facing, i.e. a child sitting in the child safety seat will look towards the windscreen of the vehicle. The child safety seat comprises a low base 2 and a shell 1 which is placed on top of the base 2 and connected to the base 2 such that the shell 1 can be reclined relative to the base 2. The base 2 of the child safety seat has ISOFIX connectors 3 for securing the child safety seat to the vehicle and at least one attachment point 7 to which a top tether 8 is connected. The shell 1 comprises at least one guiding element 6 located at an upper portion of the shell 1.

Advantageously, the guiding element 6 is mounted on an upper half of a back of the shell 1, preferably on a top third of the back of the shell 1, more preferably on a top fourth of the back of the shell 1, and even more preferably, the guiding element 6 is mounted on a top fifth of the back of the shell 1.

The top tether 8 is provided to prevent the child safety seat from rotating forward by portions of the seat including the guiding element 6, restraining that movement. Thus, the guiding element 6 should be located at an upper portion of the back of the shell of the child safety seat, i.e. near the top of the back of the shell 1, or more precisely, the guiding element 6 is advantageously located at least at an upper half of a back of the shell 1, preferably on a top third of the back of the shell 1, more preferably on a top fourth of the back of the shell 1, and even more preferably, the guiding element 6 is located on a top fifth of the back of the shell 1.

The ISOFIX connectors 3 are engaged with ISOFIX anchoring points of the vehicle to secure the child safety seat to the vehicle.

The attachment point 7 is preferably located adjacent to the fixing points 3 (ISOFIX connectors), but may also be located at parts of the base 2 which are not in the vicinity of the of the ISOFIX connectors 3 given that the respective part of the base does not move when the shell is inclined relative to the base and is robust enough to sustain the forces applied by the top tether 8.

Alternatively, the attachment point 7 may also be fixed to the ISOFIX anchoring points of the vehicle itself.

The top tether 8 can be secured to an anchoring point of a vehicle by means of a top tether hook 4 attached to one end of the top tether 8. The other end of the top tether 8 is connected to the attachment point 7. In addition, the top tether 8 is guided and slidably supported by the guiding element 6, i.e. while the top tether 8 can slide along the guiding element 6, the top tether 8 is in close contact with the guiding element 6 such that the guiding element 6 and, thus, also the upper portion of the shell 1 of the child safety seat, can be restrained from forward movements by the top tether 8 which is tightly tensioned between the anchoring point of the vehicle and the attachment point 7. The material of the top tether webbing may be similar to a seat belt webbing. Alternatively, other robust and non-stretchable materials can be used for the top tether webbing. Also, the top tether webbing will restrain the child safety seat and resist the forces acting on the child safety seat in case of a car crash.

Figure 2A:
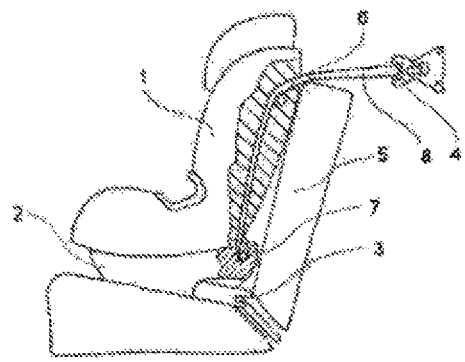
FIG. 2a shows a first embodiment of a child safety seat in accordance with the invention in an upright position.
Figure 2B:
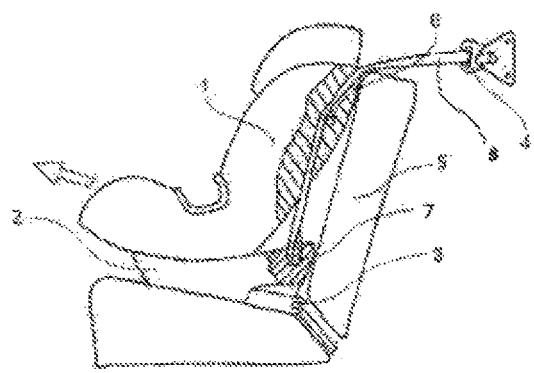
FIG. 2b shows the first embodiment of the child safety seat in accordance with the invention in a reclined position.

In the embodiment shown in FIGS. 2a and 2b, the guiding element 6 is a rod or bar attached to the shell 1 of the child safety seat in a way that the center line of the rod or bar is arranged horizontally and essentially parallel to the surface of the webbing of the top tether 8 when the top tether is tightly tensioned between the attachment point 1 and an anchoring point of the vehicle. The top tether 8 is guided between the rod and the main part of the child safety seat such that the guiding element 6 is located between the vehicle seat 5 and the top tether 8.

Even though a rod is used as the guiding element 6 in the embodiment shown in FIGS. 2a and 2b, other designs or forms for the guiding element 6 may also be used in accordance with the present invention. For example, a pulley may be used and arranged in a way similar to the arrangement of the rod, i.e. its center of rotation is arranged horizontally and essentially parallel to the surface of the tightly stretched webbing of the top tether 8. Further, an arcuate plate or any other suitably formed part may also be used, wherein the top tether 8 is led between the respective guiding element 6 and the main part of the child safety seat such that the guiding element 6 is located between the vehicle seat 5 and the top tether 8.

Alternatively, an arcuate tube having a slot may also be used, wherein the top tether is led through the slot and through the hollow inside of the tube.

However, all suitable designs of the guiding element 6 are configured to guide and slidably support the top tether 8, i.e. while the top tether 8 can slide along the guiding element 6, the top tether 8 is in close contact with the guiding element 6 such that the guiding element 6 and, thus also the upper portion of the shell 1 of the child safety seat, is restrained against forward movements by the top tether 8 which is tightly spanned between the anchoring point of the vehicle and the attachment point 7 located near the ISOFIX connectors 3.

For strong frontal impacts, the guiding element 6 may experience a defined deformation which provides an energy absorption mechanism in order to reduce the forces acting on a child seated in the child safety seat during a car crash as well as prevent damage to the shell 1 or other load path relevant items.

The deformation of the guiding element 6 is determined by material properties and/or dimension of the guiding element 6 or by material properties of the part of the shell 1 of the child safety seat which surrounds and/or supports the guiding element 6. For example, when using a rod as guiding element 6, the deformation effected by high inertial forces occurring during a strong frontal impact is dependent on the material and the diameter of the rod.

The material of that part of the shell 1 of the child safety seat which surrounds and/or supports the guiding element 6 has to endure increased mechanical stress. Thus, at least parts of the shell 1 may be reinforced to achieve higher stability and durability. However, the material of the part of the shell 1 of the child safety seat which surrounds and/or supports the guiding element 6 may also be chosen to experience a defined deformation to reduce the forces acting on a child seated in the child safety seat during a car crash and prevent damage to other parts of the shell 1 or other load path relevant items, provided the forces exerted on the guiding element 6 exceed a predetermined threshold.

Figure 1B:
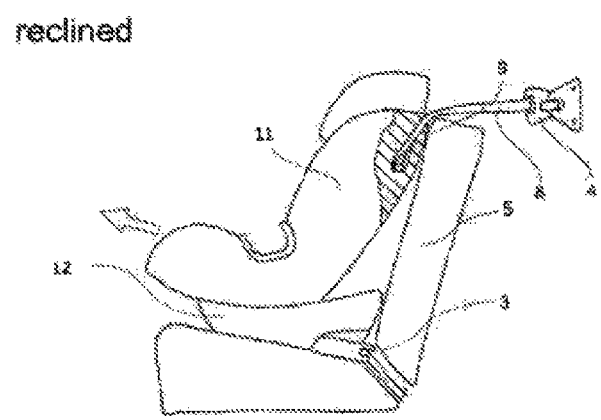
FIG. 1b shows a conventional ISOFIX child safety seat in a reclined position having a top tether connected to an anchoring point of a vehicle.

The reclining functionality of the child safety seat will be described with reference to FIGS. 2a and 2b. In contrast to top tethers attached to an upper portion of a shell 11 of a child safety seat (see FIGS. 1a and 1b), the design of the child safety seat according to the invention does not impair the recline functionality of the child safety seat since the attachment point(s) 7 for securing the top tether 8 will not move relative to the vehicle when the recline function of the child safety seat is used (i.e. when the position of the child safety seat is changed from upright to reclined or vice versa). During usage of the recline function, the webbing of the top tether 8 slides along the guiding element 6. Thus, re-adjustment of the length of the top tether 8 is not necessary when changing the position of the child safety seat.

As can be seen from FIGS. 2a and 2b, the tension of the top tether 8 does not change substantially when the position of the child safety seat is changed since the attachment point 7 for the top tether 8 does not move when the position of the child safety seat is changed from upright to reclined or vice versa. However, as the guiding element 6 moves together with the shell 1 of the child safety seat, the deviation of the top tether 8 caused by movement of the guiding element 6 is minimal. In particular, the deviation angles of the top tether webbing may vary slightly causing a minimal change of the tension of the top tether 8. Since the length adjustment required for compensating this change of the tension of the top tether 8 amounts to about 1 mm, the changed position of the guiding element 6 does not impair the recline functionality of the child safety seat and has no measurable effects on the anti-rotation performance.

Figure 3:
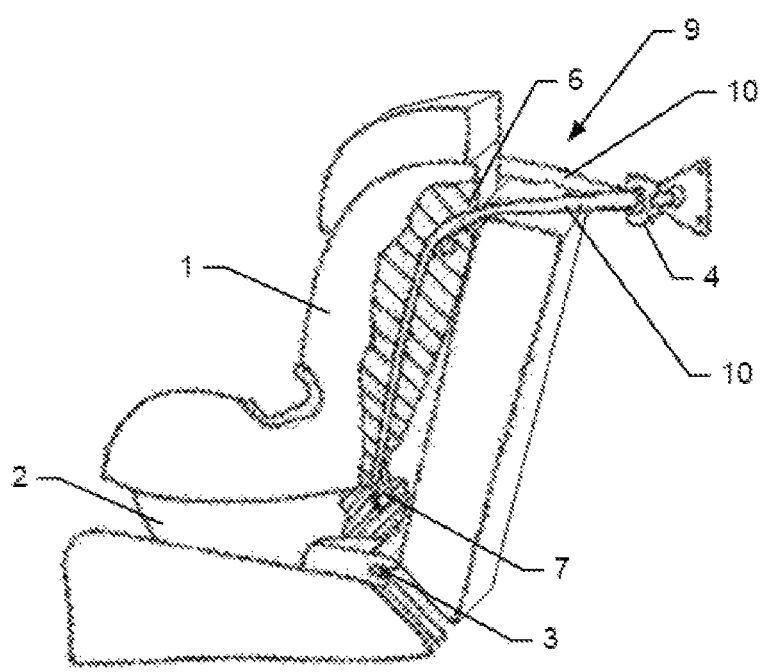
FIG. 3 shows a second embodiment of a child safety seat with a V-shaped top tether in accordance with the invention in an upright position.

A child safety seat according to the invention may comprise a single top tether 8 or, alternatively, a V-shaped top tether 9 as shown in FIG. 3.

A V-shaped top tether 9 may comprise a pair of webbing straps 10 extending from the seat 1 and joined together at the top tether hook 4. The pair of webbing straps 10 are spaced apart at the back of the seat and the guiding element 6 is wide enough to locate both straps 10 and a pair of spaced apart attachment points 7 are provided. The guiding element 6 may be configured to guide and slidably support the pair of straps 10. Each of the pair of straps may be secured to a respective one of the attachment points 7. Alternatively, a pair of guiding elements 6 may be provided but a single guiding element spanning between the spaced apart tether straps is preferred.

The invention claimed is:

1. A child safety seat comprising:
a base,
a shell comprising a guiding element mounted on an upper portion of the shell, wherein the shell is configured to be coupled to and reclinable relative to the base, and
a top tether,
wherein the guiding element is configured to guide and slidably support the top tether when the top tether is secured between a first anchoring point of a vehicle and a second anchoring point,
wherein the second anchoring point is stationary relative to the vehicle while the shell is being reclined relative to the base, and
wherein tension of the top tether does not substantially change in response to the shell being reclined relative to the base.

2. The child safety seat of claim 1, wherein the second anchoring point is fixed to the base of the child safety seat, an ISOFIX connector of the child safety seat, or an ISOFIX anchoring point of the vehicle.

3. The child safety seat of claim 1, wherein the guiding element is further configured to assist in preventing the child safety seat rotating forward about a fixing point at the base of the child safety seat when the child safety seat is anchored to the vehicle at the fixing point.

4. The child safety seat of claim 1, wherein the guiding element is a rod, a pulley, an arcuate tube, an arcuate plate or a part having a curved cross-section.

5. A child safety seat comprising:
a shell comprising a guiding element mounted on an upper portion of the shell, and
a top tether,
wherein the guiding element is configured to abut against and slidably support the top tether when the top tether is secured between a first anchoring point of a vehicle and a second anchoring point which is fixed with respect to the vehicle, and
wherein the guiding element is deformable and the extent of such deformation being dependent on the forces exerted on the guiding element by the top tether providing the forces exerted on the guiding element by the top tether exceed a predetermined threshold.

6. The child safety seat of claim 5, wherein the deformation is determined by material properties or dimensions of the guiding element.

7. The child safety seat claim 1, wherein the guiding element is mounted on an upper half of a back of the shell.

8. The child safety seat claim 1, wherein the top tether is a single top tether.

9. The child safety seat claim 1, wherein the top tether is a V-shaped top tether comprising a pair of straps, wherein the second anchoring point comprises a pair of second anchoring points, and wherein
the guiding element is configured to guide and slidably support the pair of straps, and wherein each of the pair of straps is secured to a respective one of the pair of second anchoring points.

10. The child safety seat claim 1, wherein the child safety seat further comprises a fixing point located at the base of the child safety seat and being configured to anchor the child safety seat to the vehicle.

11. The child safety seat of claim 10, wherein the fixing point of the child safety seat is an ISOFIX connector.

12. The child safety seat claim 1, wherein the child safety seat has openings extending from an attachment point of the top tether at the base of the child safety seat to the guiding element to allow the top tether connected to the attachment point to run within the openings of the child safety seat to the guiding element.

13. The child safety seat claim 1, wherein the shell of the child safety seat comprises reinforcements around the guiding element mounted on an upper portion of the shell.

14. The child safety seat claim 1, wherein the child safety seat is a forward-facing child safety seat.

15. The child safety seat of claim 1, wherein the guiding element is mounted on a top third of a back of the shell.

* * * * *